(12) United States Patent
Roby et al.

(10) Patent No.: US 6,263,672 B1
(45) Date of Patent: Jul. 24, 2001

(54) TURBOCHARGER AND EGR SYSTEM

(75) Inventors: Stephen I. Roby, Indianapolis; Steven R. McKinley, Zionsville, both of IN (US)

(73) Assignee: BorgWarner Inc., Troy, MI (US)

( * ) Notice: Subject to any disclaimer, the term of this patent is extended or adjusted under 35 U.S.C. 154(b) by 0 days.

(21) Appl. No.: 09/572,609

(22) Filed: May 17, 2000

Related U.S. Application Data

(63) Continuation of application No. 09/232,361, filed on Jan. 15, 1999, now Pat. No. 6,089,019.

(51) Int. Cl.⁷ .............................. F02M 25/07; F02B 37/00

(52) U.S. Cl. .................... 60/605.2; 60/602; 123/568.11

(58) Field of Search .................................. 60/602, 605.2, 60/324; 123/568.11, 568.21, 323

(56) References Cited

U.S. PATENT DOCUMENTS

| | | |
|---|---|---|
| 3,925,989 | 12/1975 | Pustelnik . |
| 4,206,606 | 6/1980 | Yamada . |
| 4,215,550 * | 8/1980 | Dinger et al. ........................ 60/605.2 |
| 4,220,008 | 9/1980 | Wilber et al. . |
| 4,249,382 | 2/1981 | Evans et al. . |
| 4,426,848 | 1/1984 | Stachowicz . |
| 4,445,488 | 5/1984 | Tanaka et al. . |
| 4,660,382 | 4/1987 | Ueno et al. . |
| 4,669,442 | 6/1987 | Nakamura et al. . |
| 4,689,959 | 9/1987 | Houkita et al. . |
| 4,719,757 | 1/1988 | Nakazawa et al. . |
| 4,745,752 | 5/1988 | Suzuki . |
| 4,745,753 | 5/1988 | Tadokoro et al. . |
| 4,763,474 | 8/1988 | Franklin . |
| 4,817,387 | 4/1989 | Lashbrook . |
| 5,079,921 | 1/1992 | McCandelss et al. . |
| 5,092,284 * | 3/1992 | Yamada ............................... 123/323 |
| 5,142,866 | 9/1992 | Yanagihara et al. . |
| 5,333,456 | 8/1994 | Bollinger . |
| 5,520,161 | 5/1996 | Klopp . |
| 5,531,205 | 7/1996 | Cook et al. . |
| 5,533,487 | 7/1996 | Cailey . |
| 5,611,202 | 3/1997 | Sumser et al. . |
| 5,611,203 | 3/1997 | Henderson et al. . |
| 5,611,204 | 3/1997 | Radovanovic et al. . |
| 5,617,726 | 4/1997 | Sheridan et al. . |
| 5,657,630 | 8/1997 | Kjemtrup . |
| 5,669,365 | 9/1997 | Gartner et al. . |

(List continued on next page.)

FOREIGN PATENT DOCUMENTS

| | | |
|---|---|---|
| 198 58 293 C 1 | 12/1998 | (DE) . |
| 0 531 277 A 2 | 3/1992 | (EP) . |
| 0 775 817 A 1 | 10/1996 | (EP) . |
| 2 744 491 A1 | 1/1996 | (FR) . |

*Primary Examiner*—Willis R. Wolfe
(74) *Attorney, Agent, or Firm*—Greg Dziegielewski

(57) ABSTRACT

An exhaust gas recirculation system for an internal combustion engine. The present invention includes a turbocharger, restrictor valve, and exhaust gas recirculation valve. The restrictor valve is upstream of the turbine of the turbocharger, and restricts the flow of exhaust gas into the turbine. This restriction results in an increase in pressure of the exhaust gas provided to the restrictor valve. The increased pressure exhaust gas is provided to the inlet of an exhaust gas recirculation valve which may be actuatable independently of the actuation of the restrictor valve. The restrictor valve may be modulated until exhaust pressure is greater than the pressure of the intake gas. The restrictor valve creates a pressure differential suitable for recirculating a portion of exhaust gas through the EGR valve and into the intake manifold of the engine. The restrictor valve may also be operated without recirculation of exhaust gas, such as during cold starting of a diesel engine so as to increase the load on the engine and decrease the warm-up time of the engine. Some embodiments of the present invention utilize an electronic controller for operating the restrictor valve and the EGR valve.

24 Claims, 10 Drawing Sheets

U.S. PATENT DOCUMENTS

| | | |
|---|---|---|
| 5,671,600 | 9/1997 | Pischinger et al. . |
| 5,682,746 | 11/1997 | Von Hoerner . |
| 5,701,874 | 12/1997 | Sari et al. . |
| 5,711,154 | 1/1998 | Baechle et al. . |
| 5,740,785 | 4/1998 | Dickey et al. . |
| 5,740,786 | 4/1998 | Gartner . |
| 5,771,867 | 6/1998 | Amstutz et al. . |
| 5,771,868 | 6/1998 | Khair . |
| 5,778,674 * | 7/1998 | Kimura ................................ 60/605.2 |
| 5,806,308 * | 9/1998 | Khair et al. ........................ 60/605.2 |
| 5,943,864 * | 8/1999 | Sumser et al. ..................... 60/605.2 |
| 5,974,795 * | 11/1999 | Muraki et al. ......................... 60/324 |
| 6,000,222 * | 12/1999 | Regnier ............................... 60/605.2 |
| 6,089,019 * | 7/2000 | Roby et al. ......................... 60/605.2 |

* cited by examiner

TURBOCHARGER AND EGR SYSTEM

This is a continuation of application Ser. No. 09/232,361, filed Jan. 15, 1999, now U.S. Pat. No. 6,089,019.

BACKGROUND OF THE INVENTION

1. Field of the Invention

The present invention relates to an exhaust gas recirculation system for an engine with a turbocharger.

Recirculation of exhaust gas into the intake gas of an internal combustion engine is widely recognized as a significant method for reducing the production of nitrous oxides ($NO_x$) during the combustion process. The recirculated exhaust gas partially quenches the combustion process and lowers the peak temperature produced during combustion. Since $NO_x$ formation is related to peak temperature, recirculation of exhaust gas reduces the amount of $NO_x$ formed.

In order to recirculate exhaust gas into the intake manifold, the exhaust gas must be at a pressure that is greater than the pressure of the intake gas. However, in a turbocharged engine, the intake gas is typically at a pressure higher than that of the exhaust gas. This is because the compressor of the turbocharger purposefully increases the pressure of the intake gas while producing only a signal increase in the pressure of the exhaust gas. Therefore, the pressure differential from exhaust gas, to intake gas for a turbocharged engine, is often in the wrong direction to have flow from the exhaust system to the intake system. This is especially true at peak torque operation, where the inlet system is significantly boosted in pressure, and the combustion temperatures are relatively high.

Various systems have been proposed to provide recirculated exhaust gas for an engine with a turbocharger. In one design, a butterfly-type valve is placed at the exhaust of the turbine so as to backpressure the exhaust system. However, this backpressuring of the turbine results in a thrust load on the turbocharger rotor system which increases wear of the turbocharger bearings. Furthermore, exhaust gas under pressure may leak past the seals and bearings of the turbocharger and flow with the returned lubricating oil into the crankcase of the engine, undesirably increasing engine crankcase pressure.

In yet another design, a combination backpressure/EGR valve is provided at the turbine inlet. In this valve, the actuation of the backpressure valve is mechanically locked to the actuation of the EGR valve. This valve does not include flexibility to change the backpressuring of the exhaust system independently of the recirculation of exhaust gas. This lack of flexibility means that the amount of exhaust gas recirculated may be optimized for a single or narrow range of conditions, and would be non-optimum for most conditions. Also, such a combination valve does not permit backpressuring of the exhaust system during cold start up of the engine without also permitting a high degree of recirculated exhaust gas flow. Such a combination valve would be less than optimum for reduction of white smoke from a diesel engine during cold starting and warm-up.

What is needed is an exhaust gas recirculation system that provides improvements to current systems. The present invention provides a novel and unobvious EGR system that provides those improvements.

SUMMARY OF THE INVENTION

One aspect of the present invention is an exhaust gas recirculation system for an internal combustion engine producing exhaust gas and accepting intake gas. The system includes a turbocharger for increasing the pressure of the intake gas to the engine, the turbocharger having a turbine. There is also a restrictor valve for accepting the exhaust gas from the engine which is adjustable to increase the pressure of the exhaust gas. The restrictor valve has an outlet in fluid communication with the turbine. There is also an exhaust gas recirculation valve (EGR) with an inlet for receiving exhaust gas from the engine and settable for providing exhaust gas to the intake gas of the engine. The restrictor valve is adjustable independently of the setting of the exhaust gas recirculation valve.

In another aspect, the present invention includes a turbocharger, a restrictor valve, and an exhaust gas recirculation valve. The turbocharger has a turbine and an inlet passage, the inlet passage having a first flow resistance. The restrictor valve is located proximate to the inlet passage, the restrictor valve having a variable flow resistance selectively variable between a maximum and a minimum. The maximum flow resistance is greater than the first flow resistance. The restrictor valve has a first inlet and a first outlet, the first outlet being in fluid communication with the turbine. The exhaust gas recirculation valve has a second inlet and a second outlet, and a valve member selectively movable between opened and closed positions. The second inlet is in fluid communication with the first inlet of the restrictor valve. The second inlet and second outlet are in fluid communication in the opened position. The second outlet is substantially sealed from the second inlet in the closed position. The restrictor valve is selectively variable independent of the movement of the valve member of the EGR valve.

In another aspect of the present invention, there is an apparatus that includes an internal combustion engine, a restrictor valve, and a turbocharger. The internal combustion engine accepts intake gas and produces exhaust gas. The restrictor valve has an inlet for accepting exhaust gas from the internal combustion engine, a first outlet, a second outlet, and a flow-restricting device movable between first and second positions. The first position substantially restricts fluid communication from the inlet to the first outlet, and from the inlet to the second outlet. The second position substantially restricts fluid communication from the inlet to the first outlet. The turbocharger has a turbine inlet in fluid communication with the first outlet of said restrictor valve. Exhaust gas from the second outlet is mixed with intake gas.

In another aspect of the present invention, there is a system which includes an internal combustion engine, a restrictor valve, a turbocharger, an EGR valve, a first sensor, a second sensor, and a controller. The engine produces exhaust gas and accepts intake gas, the exhaust gas being at a first pressure and the intake gas being at a second pressure. The engine also has an intake manifold. The restrictor valve receives exhaust gas from the engine and has a variable flow resistance and an actuatable flow restricting device for varying the flow resistance of the restrictor valve. The restrictor valve has a first outlet. The turbocharger has a turbine with a first inlet, the first inlet being in fluid communication with the first outlet of the restrictor valve. The EGR valve has a second inlet accepting the exhaust gas and a second outlet in fluid communication with the intake manifold. The first sensor provides a first signal corresponding to the first pressure. The second sensor provides a second signal corresponding to the second pressure. The controller is responsive to the first signal and the second signal, the controller actuating the flow-restricting device to increase the first pressure so that the first pressure is greater than the second pressure.

In another aspect of the present invention, there is a turbocharger for an internal combustion engine that produces exhaust gas. The turbocharger includes a turbine, a compressor, a restrictor valve, a poppet valve, and a support housing assembly. The turbine has a first inlet, and the compressor has a first outlet. The restrictor valve restricts the flow of exhaust gas into the first inlet of the turbine. The poppet valve has a second inlet and a second outlet. The second inlet is in fluid communication with the first inlet of the turbine, and the second outlet is in fluid communication with the first outlet of the compressor. The poppet valve has an opened position in which the second outlet is in fluid communication with the second inlet and a closed position in which the second outlet is substantially sealed from the first inlet. The support housing assembly supports the turbine, compressor, restrictor valve, and poppet valve.

The present invention also includes a method for recirculating a predetermined flow of exhaust gas into the intake manifold of a turbocharged engine. The method includes providing an internal combustion engine, a turbocharger for receiving exhaust gas from the engine at a first pressure and providing intake gas to the engine at a second pressure, a restrictor valve, and an exhaust gas recirculation valve. The method includes adjusting the restrictor valve to increase the first exhaust pressure provided to the turbocharger until the first exhaust pressure is greater than the second intake pressure. The method includes opening an exhaust gas recirculation valve to permit recirculation of exhaust gas into the intake gas. The method also includes readjusting the restrictor valve to achieve the predetermined exhaust gas flow.

These and other objects and advantages of the present invention will be apparent from the description of the preferred embodiment, drawings, and claims to follow.

DESCRIPTION OF THE PREFERRED EMBODIMENT

Figure 1:
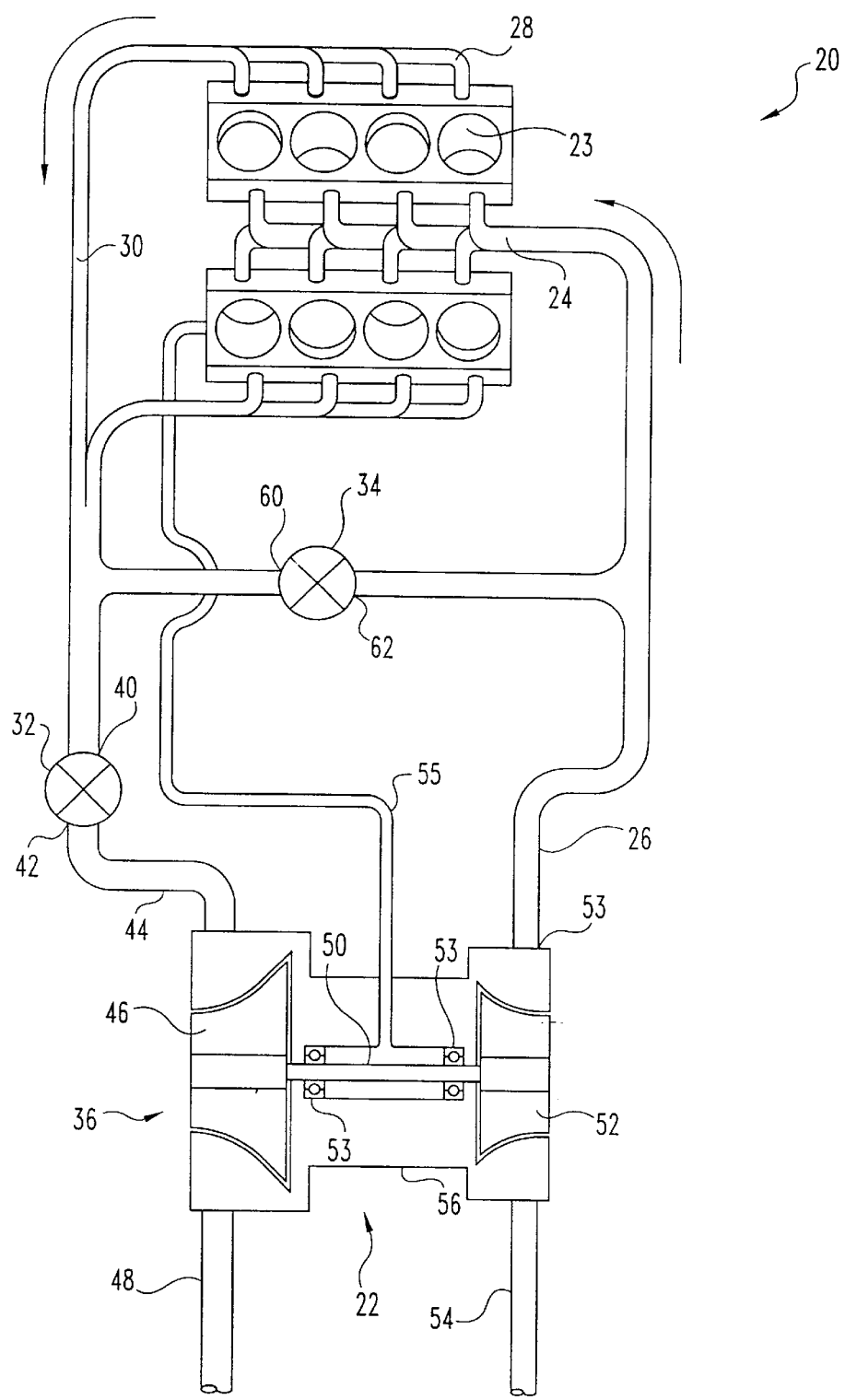
FIG. 1 is a schematic representation of an engine with an exhaust gas recirculation system according to one embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The present invention relates to a system for recirculating exhaust gas of an internal combustion engine from the exhaust passageways to the intake passageways. In one embodiment, the present invention includes a turbocharger, restrictor valve, and exhaust gas recirculation (EGR) valve. The EGR valve is opened to permit recirculation of exhaust gas into the intake passageways. The restrictor valve is adjustable so as to increase the pressure of the exhaust gas upstream of the turbine of the turbocharger at the inlet to the EGR valve. Under some engine operating conditions the EGR valve remains closed, and the increased pressure of the exhaust gas provides an additional load to the engine.

In a conventional manner, the turbocharger accepts exhaust gas from the internal combustion engine and produces power in a turbine which is used to drive a compressor. The compressor increases the pressure of intake gas being accepted by the engine. The pressure of the intake gas at the compressor discharge, or compressor outlet, is variable, and is related to, among other things, the amount of power being provided by the turbine. The power delivered by the turbine depends upon the temperature and pressure of the exhaust gas, as well as other factors.

Under some operating conditions, such as a diesel engine producing peak torque, the pressure of the intake gas is higher than the pressure of the exhaust gas. Because of this adverse pressure gradient, exhaust gas does not recirculate into the intake.

In order to recirculate exhaust gas into the intake, the present invention provides a restrictor valve placed upstream of the turbine. The restrictor valve includes a movable flow-restricting device that can be adjusted so as to increase the resistance of the restrictor valve to the flow of exhaust gas. By increasing flow resistance, the pressure of the exhaust gas being provided to the restrictor valve increases and the pressure of exhaust gas flowing from the restrictor valve to the turbine may decrease. By decreasing the pressure of exhaust gas provided to the turbine, turbine power decreases and the pressure of the intake gas also decreases because of the lower power available to the compressor.

In one embodiment of the present invention, the restrictor valve includes a butterfly-type flow restricting device. In another embodiment, the restrictor valve includes a semicylindrical flow restricting device that is rotatable within a semicylindrical pocket. In yet another embodiment of the present invention, the restrictor valve includes one or more movable inlet vanes for the turbine that change the inlet flow area to the turbine and/or the incidence angle of the exhaust gas flowing onto the rotating turbine blades. In yet another embodiment, the variable vanes produce other aerodynamic effects, such as changing the incidence angle for the air being provided to the blades of the turbine, and in some cases decreasing the efficiency of the turbine and increasing the resistance of the turbine to flow.

In the present invention, placement of the restrictor valve upstream of the turbine results in less pressure differential on the turbine and compressor rotor than if the restrictor valve were placed downstream of the turbine. Downstream placement of the restrictor valve generates a net aerodynamic force differential on the turbocharger rotor, thereby affecting bearing life. Also, downstream placement of the restrictor valve also increases the pressure of gas within the oil return passageways of the turbocharger, thus increasing pressure within the crankcase of the engine. Upstream placement of the restrictor valve thereby results in increased bearing life and decreased blow-by of gas into and out of the crankcase.

Some embodiments of the present invention also include one or more exhaust gas recirculation valve (EGR valve). Reference to an EGR valve includes both single and multiple valve embodiments. The EGR valve has an inlet in fluid communication with the increased pressure exhaust gas upstream of the flow restricting device, and an outlet in fluid communication with an intake passageway provided with intake gas. The EGR valve includes a valve member selectively moveable between opened and closed positions. In the closed position, there is substantially no flow of either intake gas or exhaust gas past the valve member, except for leakage. In the opened position, fluid communication is established from the EGR valve inlet to the EGR valve outlet. Preferably, the EGR valve fully opens to a position with a fixed flow area for simplicity of design. This can be accomplished by placing mechanical stops on the travel of the movable valve member or on the travel of the linkage that moves the valve member, or by electronic feedback of valve position to a controller that maintains valve position. However, the present invention also contemplates those EGR valve in which the valve member may be adjusted to positions intermediate of fully opened or fully closed positions.

In one embodiment of the present invention, the EGR valve is opened when the exhaust gas pressure is greater than the intake gas pressure, such that exhaust gas will flow into the intake passageway of the engine. In another embodiment of the present invention, the valve member of the EGR valve includes one or more poppet valve(s), similar to an exhaust poppet valve in a cylinder head of an internal combustion engine. The poppet valve(s) may be actuated in a variety of ways, including direct actuation along the stem of the valve, and also by a rocker arm acting on the valve stem. In another embodiment of the present invention, the EGR valve is a wastegate valve.

In yet another aspect of the present invention, the restrictor valve and EGR valve are both located within the support housing assembly of the turbocharger. The restrictor valve is located proximate to the turbine inlet passage. In one embodiment, the a butterfly-type restrictor valve is located at a flange of the turbine inlet passageway. In another embodiment of the present invention, the barrel-type restrictor valve is located near a flange of the turbine inlet passage. In yet another embodiment, the variable guide vanes are located along the turbine inlet passage near the blades of the turbine.

In those embodiments of the present invention including an EGR valve, the EGR valve is preferably supported by the support housing assembly. In those embodiments including a butterfly valve or barrel valve, the EGR valve is preferably located proximate to the butterfly valve or barrel valve. In those embodiments including variable turbine vanes, the EGR valve is preferably placed within a portion of the support housing assembly, with a portion of the valve member being in fluid communication with the turbine inlet passage.

To further enhance the packaging of the EGR system, the EGR valve and the restrictor valve are preferably actuated by high pressure hydraulic fluid such as the pressure available from hydraulic pressure used to actuate diesel engine fuel injectors, or some other source of hydraulic fluid. The present invention also contemplates actuators using lower pressure fluids such as engine lubricating oil, and also pneumatic sources and electric motors.

Some embodiments of the present invention have portions of the EGR valve and portions of the restrictor valve packaged within the support housing assembly, such that there is a reduction in the volume of the passageways proximate to the EGR valve and restrictor valve. Preferably, the entire restrictor valve and entire EGR valve are packaged with the support housing assembly. By reducing the volume of passageways proximate to these valves, it is possible to reduce the transport lag and the transient response of the EGR system, resulting in improved performance for the engine. In addition, this preferred packaging requires less total volume for packaging of the turbocharger, EGR valve, and restrictor valve, resulting in more engine compartment volume available for other conponents. However, the actuating means for the EGR valve and restrictor valve should be compatible with the high temperatures of the support housing assembly.

In those embodiments of the present invention utilizing variable vanes for the turbine, partial closure of the vanes results in a higher turbine/compressor rotor speed for the same exhaust back pressure as created by other restricting devices. By having a higher rotor speed, especially at idle, the transient response of the turbocharger and the engine is improved. This improved transient response results in reduced emission of particulates and improved operation of the engine during governmental emission measuring tests, including the US EPA and European Euro emissions tests.

In some embodiments of the present invention, the exhaust gas recirculation valve and the restrictor valve are independently actuatable of each other. For example, the restrictor valve can be substantially closed when the EGR valve is substantially closed. This closure of both valves provides a back pressure to a diesel engine that is useful in reducing the white smoke produced by the diesel engine during cold start engine operation. By further way of example, the EGR valve can be opened when the restrictor valve is substantially closed, thus increasing the pressure of the exhaust gas provided to the inlet of the EGR valve and thereby providing recirculated exhaust gas to the intake gas. This operation of the EGR system can provide recirculated exhaust gas during periods of operation of a diesel engine such as peak torque. By further way of example, the EGR valve can be kept closed and the moveable flow restricting device of the restrictor valve maintained in a position of minimum flow resistance, such that there is no recirculated exhaust gas provided to the intake gas and the operation of the turbine is substantially unhindered by any flow restriction.

In one embodiment of the present invention the restrictor valve and EGR valve are operated by a controller, such as a digital electronic controller which includes a digital processor or an analog electronic controller. As an example, the controller can position the flow restricting device until exhaust pressure from the engine exceeds the pressure of the intake gas. Opening of the EGR valve under these conditions provides recirculated exhaust gas into the intake gas. In still other embodiments of the present invention, the placement of the flow restricting device to provide an exhaust gas pressure greater than the pressure of the intake gas can be accomplished by mechanical controllers, for example such as the mechanical controllers that utilize spring and diaphragm arrangements well known to those of ordinary skill in the art.

FIG. 1 schematically depicts an internal combustion engine 20 with an exhaust gas recirculation system 22. Engine 20 includes one or more cylinders 23 for producing power. Each cylinder 23 is provided intake gas by an intake manifold 24 in fluid communication with an intake passageway 26. Combustion of fuel and the intake gas within the cylinder produces exhaust gas which is pumped out of cylinder 23 into exhaust manifold 28. The exhaust gas flows through manifold 28 and into exhaust conduit 30.

Exhaust gas in conduit 30 is provided to EGR system 22, which preferably includes a restrictor valve 32, an EGR valve 34, and a turbocharger 36. Restrictor valve 32 includes an actuatable flow restricting device capable of varying valve flow resistance in response to an input from a controller. The variable flow resistance increases the flow resistance of valve 32, and thereby increases the pressure of the exhaust gas within conduit 30 and the pressure of exhaust gas provided to EGR valve 34. Restrictor valve preferably does not include an outlet for bypassing exhaust gas around the turbine of the turbocharger, although some embodiments do include such a bypass, such as a wastegate or other bypassing device. EGR valve 34 provides a means for controlling the flow of recirculated exhaust gas to be provided to intake passageway 26 in response to an input from a controller. The outlet of EGR valve 34 is in fluid communication preferably with both outlet 53 of turbocharger compressor 52 and intake manifold 24.

A portion of exhaust gas in conduit 30, and preferably about 85% or more of the exhaust gas, enters inlet 40 of restrictor valve 32 and passes through to valve outlet 42. Outlet 42 is in fluid communication with turbine inlet passageway 44 which provides the exhaust gas to turbine 46 of turbocharger 36.

Turbine 46 is part of a rotor system 50 that includes a compressor 52. Compressor 52 is provided intake gas through inlet 54, compresses the gas to a higher pressure and delivers it through compressor outlet 53 into intake passage 26. Rotor 50 is supported by bearings 53 within a support housing assembly 56. Housing assembly 56 includes various static support structures of turbocharger 36, and can include static structures such as inlet and outlet flanges and housings, bearing supports, gas path structures such as scrolls and diffusers, and compressor covers and turbine housings. A lubricant for bearings 53 is provided by the lubrication system of engine 20. The lubricant returns to the crankcase of engine 20 by return path 55. Return path 55 also includes exhaust gas and intake gas that leak past the seals (not shown) proximate to bearings 53. This leakage gas is also provided through pathway 55 into the crankcase of engine 20.

Figure 2C:
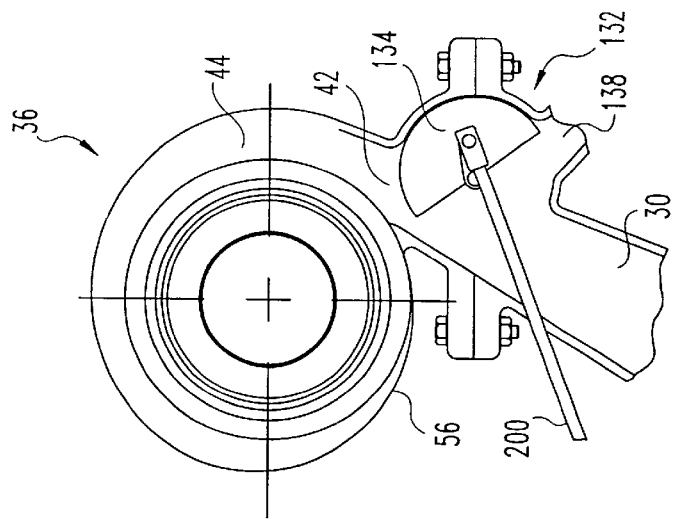
FIG. 2C shows the valve of FIG. 2A in a different position.
Figure 2B:
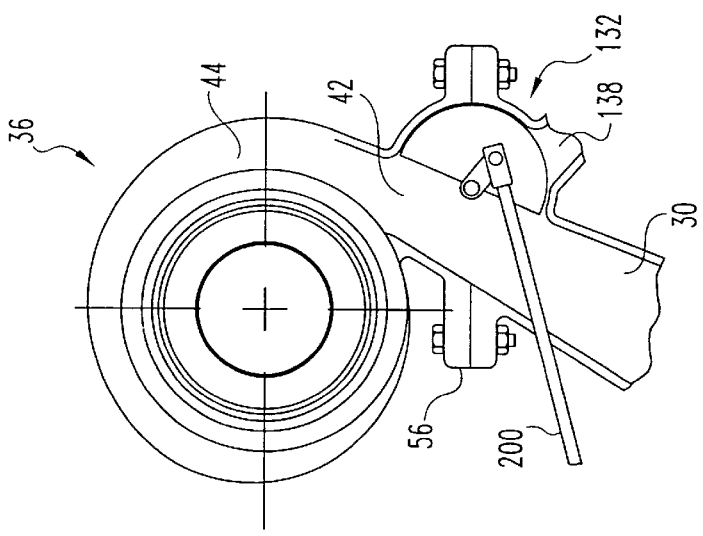
FIG. 2B shows the restrictor valve of FIG. 2A in a different position.
Figure 2A:
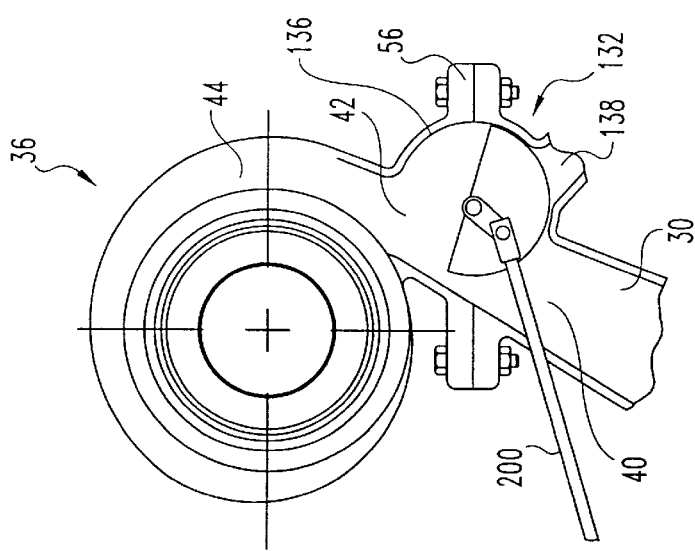
FIG. 2A is a schematic representation of a restrictor valve in one position according to one embodiment of the present invention.

FIGS. 2A, 2B, and 2C show one embodiment of a restrictor valve in various stages of operation. Restrictor valve 132 includes a barrel-shaped, semi-cylindrical flow restricting device 133 that is rotatable within a semi-cylindrical pocket 136. At least a portion of flow restricting device 133 and/or semi-cylindrical pocket 136 are within support housing 56. Device 133 is movable within pocket 136 by being rotatable in response to movement of actuating linkage 200. Linkage 200 provides an input to valve 232 in response to a controller-based actuator input.

As shown in FIG. 2A, device 133 has been rotated to a position that substantially restricts fluid communication from inlet 40 to outlet 42, and also from inlet 40 to outlet 138. Outlet 138 of barrel valve 132 is preferably in fluid communication with inlet 60 of EGR valve 34, but may also be in fluid communication with, for example, an EGR cooler (not shown) or some other device capable of placing outlet 138 in fluid communication with intake passage 26. The position of valve 132 shown in FIG. 2A reduces white smoke generated by a cold diesel engine, for example, by providing a back pressure to engine 20 through exhaust conduit 30. Preferably, device 133 does not completely block inlet 40 so that some exhaust flow passes into turbine 46.

In FIG. 2B, flow restricting device 133 has been actuated to a position in which there is little or no additional flow resistance to turbine inlet passage 44, such that exhaust gas from conduit 30 flows generally unimpeded through restrictor valve 132 and into turbine 46. This position of flow restricting device 133 substantially restricting the flow of exhaust gas into passageway 138. This position of device 134 permits normal operation of turbine 36, with little or no exhaust gas recirculated into intake passageway 26.

As shown in FIG. 2C, restricting device 133 has been rotated by linkage 200 to another position in which there is fluid communication from restrictor valve inlet 40 to second valve outlet 138. Device 133 is also shown in a position in which the variable flow resistance of valve 132 has been varied to a maximum flow resistance which is greater than the flow resistance of turbine inlet passage 44. In this position, flow restricting device 133 has a flow resistance greater than the flow resistance of turbine inlet passage 42, with a result that pressure of the exhaust gas in conduit 30 increases to a value higher than that which would be achieved for device 133 as positioned in FIG. 2B. Exhaust gas at valve inlet 40 is also in fluid communication with second valve outlet 138, through which the exhaust gas may be provided to EGR valve 34, or directly to intake passageway 26, or to an EGR cooler (not shown) or to another device known to those of ordinary skill in the art for conditioning or controlling the flow of recirculated exhaust gas. The flow restricting device of restrictor valve 132 may be adjusted to positions between the positions shown in FIGS. 2A, 2B, and 2C.

Figure 3:
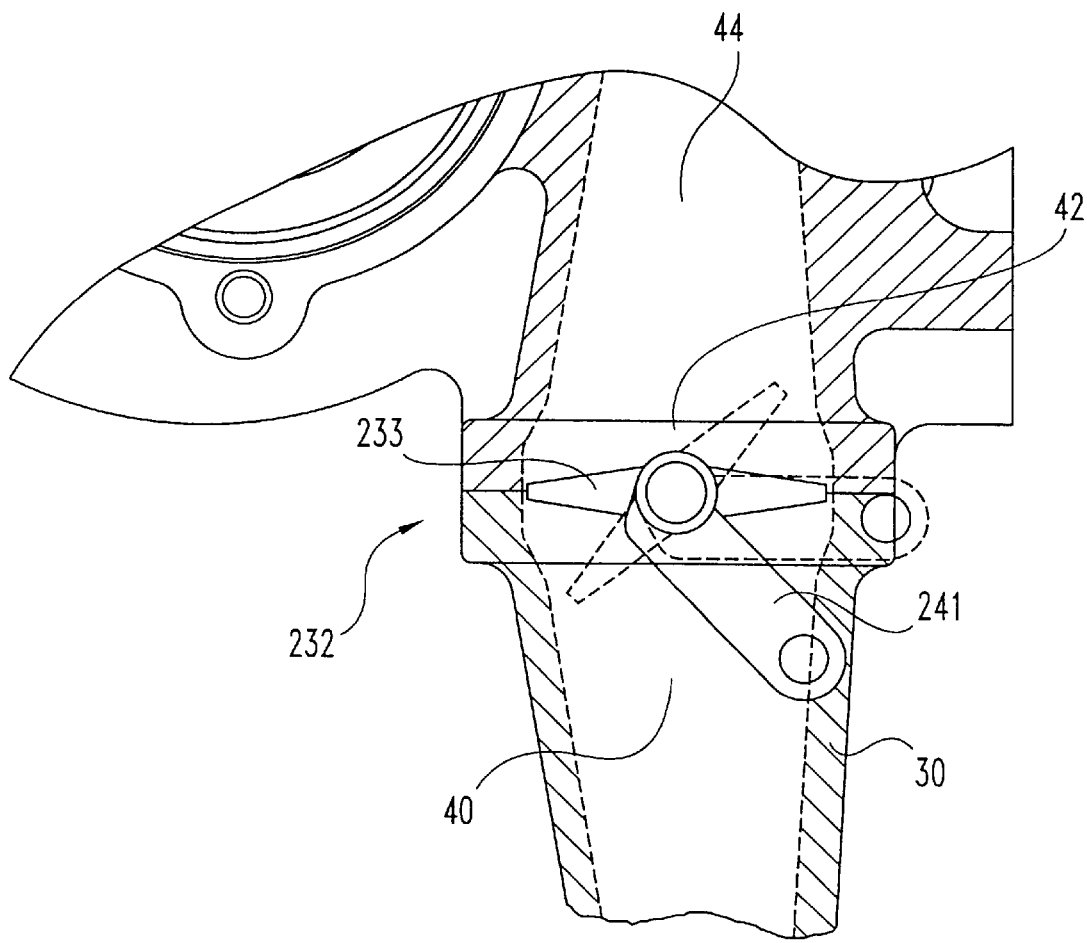
FIG. 3 is a drawing of a restrictor valve according to another embodiment of the present invention.

FIG. 3 depicts restrictor valve 232, which is another embodiment of a restrictor valve. Valve 232 includes a moveable flow restricting device 233 which is a butterfly-type valve element. Restricting device 233 is shown in solid lines in a position in which flow of exhaust gas into turbine inlet passage 44 is substantially restricted, resulting in an increase in exhaust gas pressure in conduit 30. Restricting device 233 is also shown in dotted lines in a position of lesser flow resistance, resulting in an increase in exhaust gas pressure in conduit 30, but not as much of an increase as for the position shown in solid lines. Restricting device 233 may also be substantially aligned within valve 232 in a position of minimum resistance to flow, which results in the flow of exhaust gas into turbine inlet passage 44 with little, if any, pressure drop across valve 232.

The cross-sectional flow area defined by the internal walls of restrictor valve 232 preferably is increased from the cross-sectional flow area downstream or upstream of valve 232, so as to account for the blocking flow area of device 233 when aligned for minimum flow resistance. Also, the widening of the cross-sectional area of valve 232 permits some exhaust gas to flow around restricting device 233 as shown in the solid line position. The flow around device 233 prevents turbine inlet passage 44 from being completely closed off during valve operation when maximum flow resistance is required. An actuating lever 241 is coupled to restricting device 233, and provides a lever arm to which actuating linkage 200 is attached. Linkage 200 provides an input to valve 232 in response to a controller-based actuator input.

Figure 4:
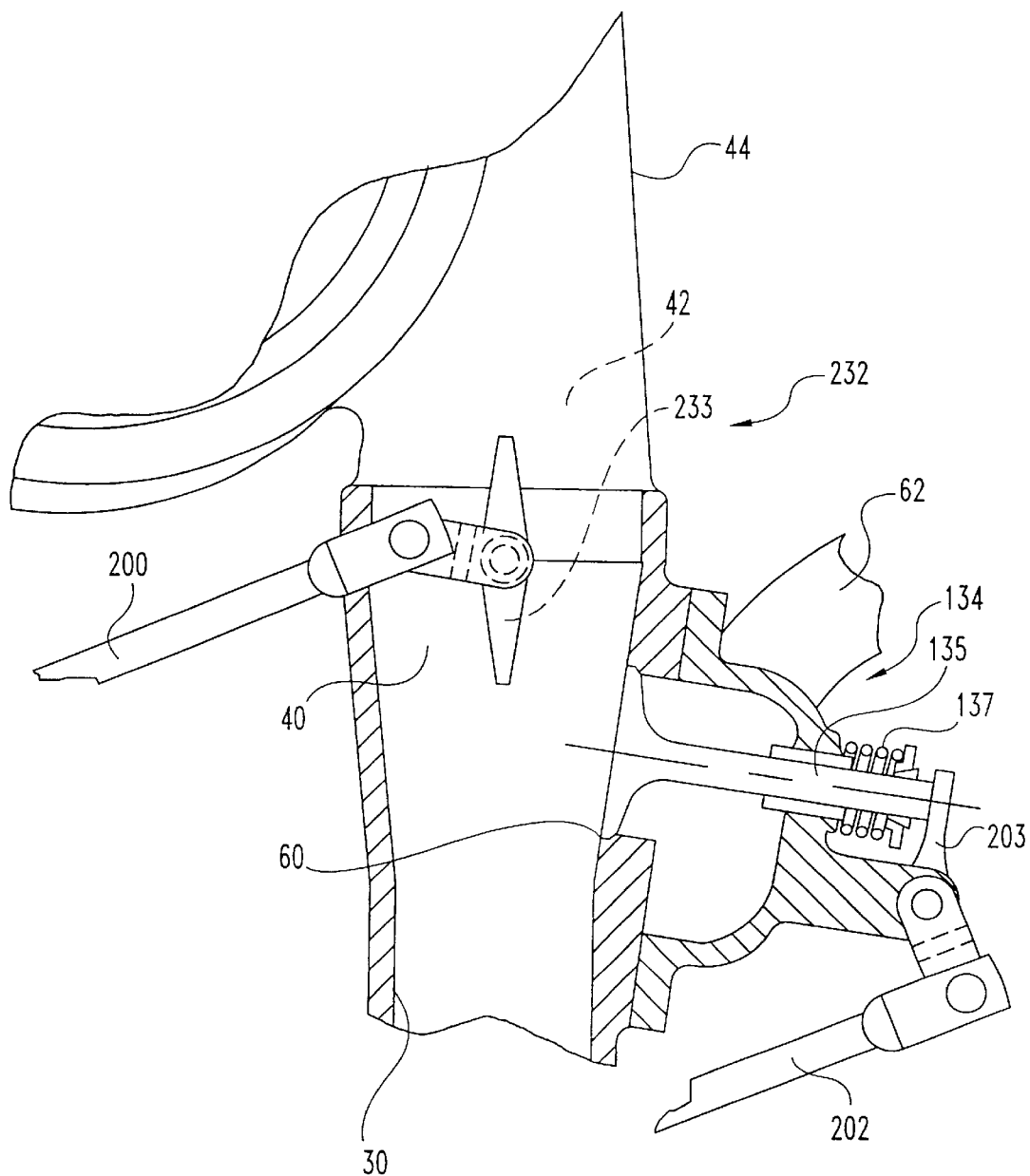
FIG. 4 is a drawing of a restrictor valve and an EGR valve according to another embodiment of the present invention.

FIG. 4 depicts an embodiment of the present invention which includes an EGR valve and a restrictor valve. Restrictor valve 232 is shown with flow restricting device 233 adjusted to a position of minimum flow resistance. The embodiment of the EGR valve shown in FIG. 4 is valve 134, which includes a valve member 135 selectively moveable between opened and closed positions. In one embodiment of the present invention, valve member 135 is a poppet valve, such as, for example, an exhaust poppet valve from an internal combustion engine. However, the present invention also contemplates the use of other types of valves currently used for recirculation of exhaust gas, and also contemplates the use of a turbocharger wastegate valve. Preferably, the EGR valve should be able to transition from the opened position to the closed position in about 0.050 seconds or less.

Valve member 135 is biased by spring 137 to the closed position, as shown in FIG. 4. Actuating of linkage 202 pivots rocker arm 203 to push member 135 to the opened position. EGR valve inlet 60 is in fluid communication with restrictor valve inlet 40. When EGR valve 134 is opened, valve inlet 60 is in fluid communication with EGR valve outlet 62. Valve outlet 62 is preferably in fluid communication with an EGR cooler (not shown), and also in fluid communication with intake passageway 26. When valve 134 is closed, inlet 60 is substantially sealed from outlet 62. Linkage 202 provides an input to valve 134 in response to a controller-based actuator input.

In one embodiment of the present invention, the restrictor valve is selectively variable independently of the movement of the EGR valve. As shown in FIG. 4, restrictor valve actuating linkage 200 may be actuated independently of EGR valve actuating linkage 202. Restrictor valve 232 may be adjusted to a position providing more than the minimum flow resistance of valve 232, such that exhaust pressure provided to inlets 40 and 60 is increased. Valve 134 is preferably opened when exhaust pressure at inlet 60 is greater than intake gas pressure within intake passageway 26. Also, valve 134 may be maintained in the closed position and valve 232 moved to a position of substantial restriction such that an additional load is placed upon engine 20. This additional load can provide decreased warm up times for a cold diesel engine, for example.

Figure 5:
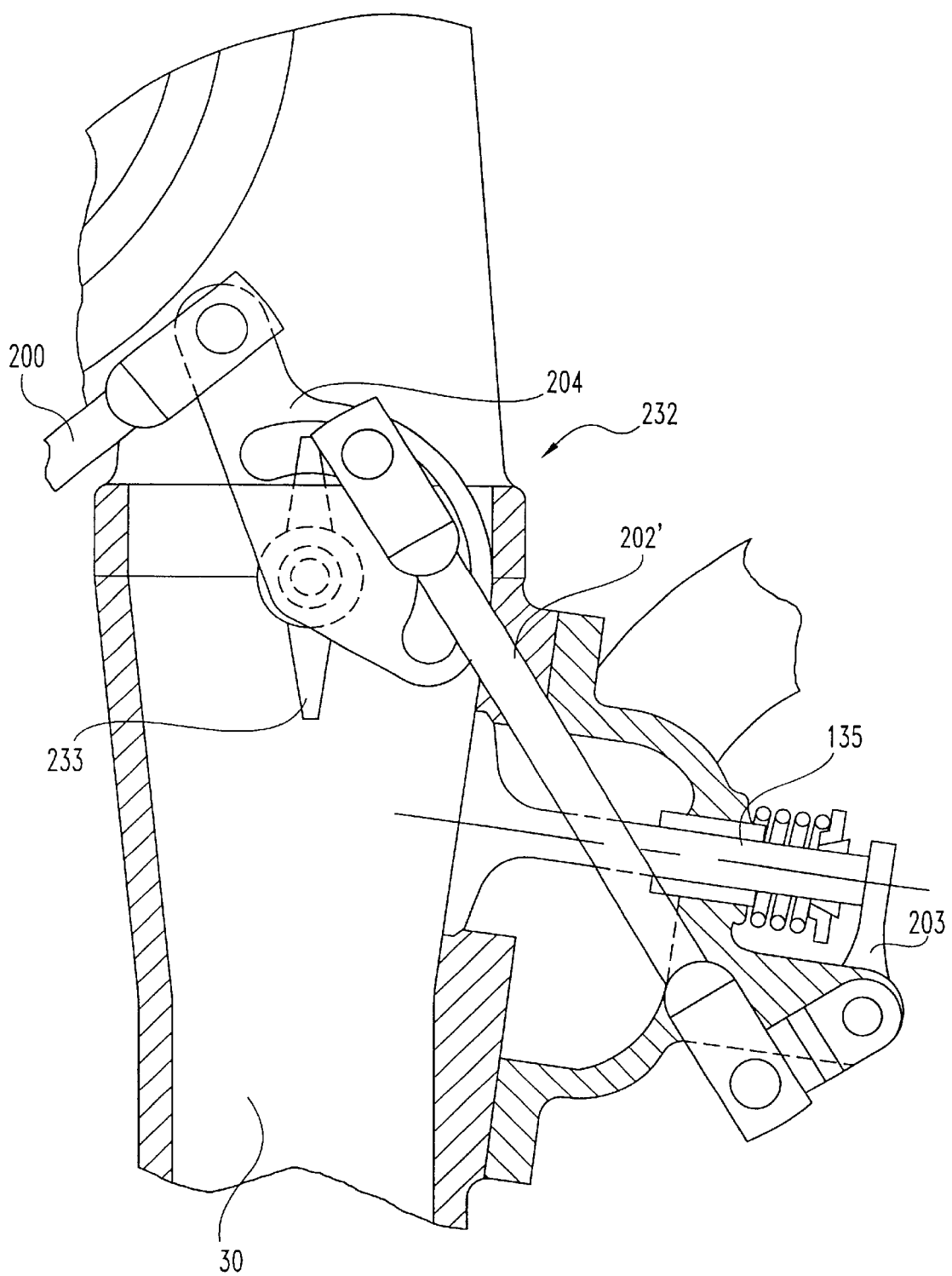
FIG. 5 is a drawing of a restrictor valve and an EGR valve according to another embodiment of the present invention.

FIG. 5 depicts another embodiment of the present invention in which the movement of the valve member of the EGR valve is dependent upon the movement of the restricting device of the restrictor valve. For example, movement of actuating linkage 200 in one embodiment turns a pivotal lever arm 204. Movement of lever arm 204 causes rotation of restricting device 233. One end of actuating linkage 202' is slidably coupled to lever 204, such that rotation of restricting device 233 to a position of substantial restriction causes lever 204 to push linkage 202' so as to set valve member 135 to the opened position by means of rocker arm 203.

Figure 10:
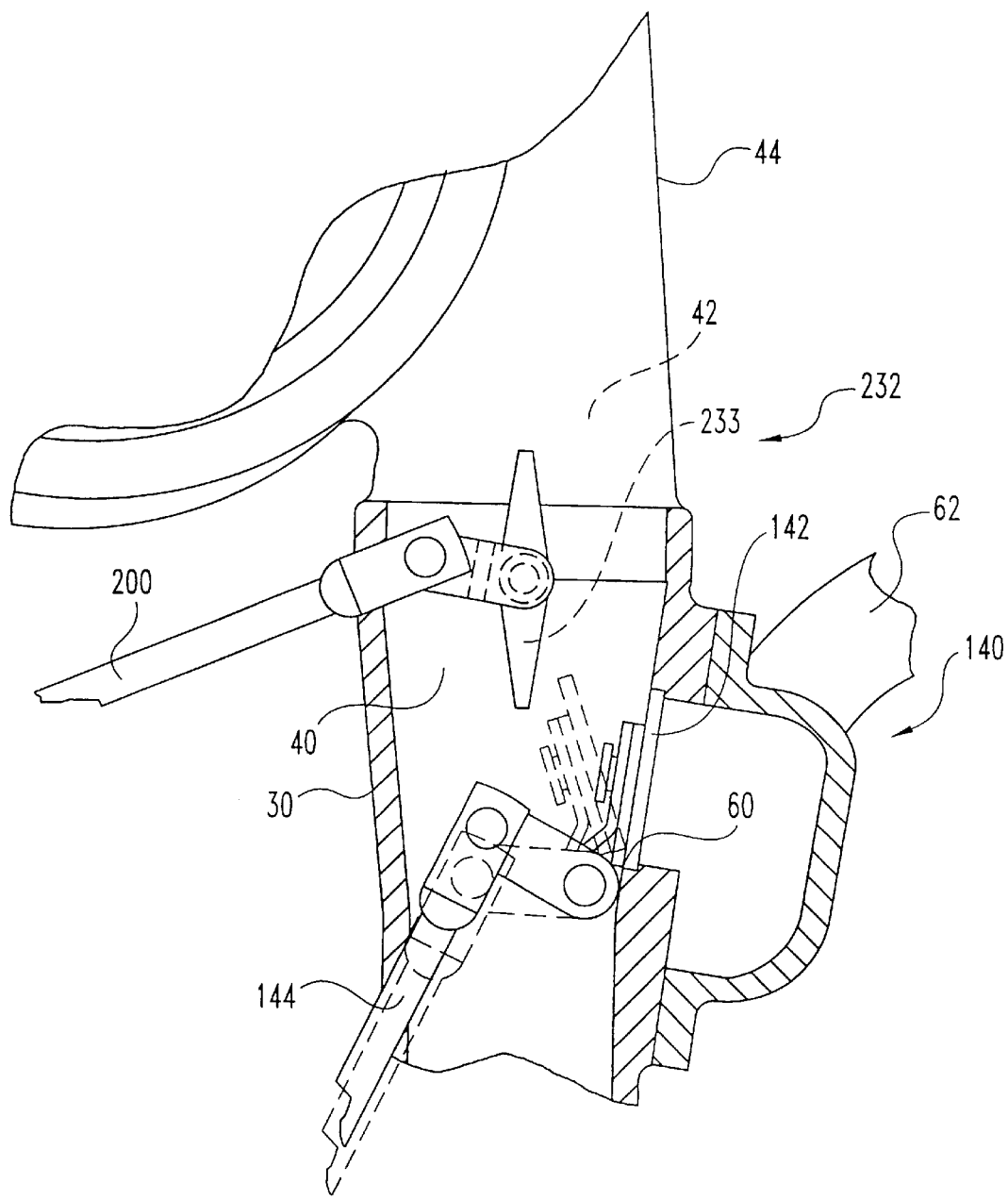
FIG. 10 is a cross sectional view of an EGR valve according to another embodiment of the present invention.

FIG. 10 depicts another embodiment of the present invention in which a wastegate valve is used as an EGR valve. An EGR valve 140 includes a valve member 142 selectively moveable between opened and closed positions. The opened position of member 142 is indicated in dotted lines. An actuating linkage 144 actuated by a hydraulic, pneumatic, electric, or other source of power causes member 142 to pivot about an pivotable joint between opened and closed positions.

Figure 6:
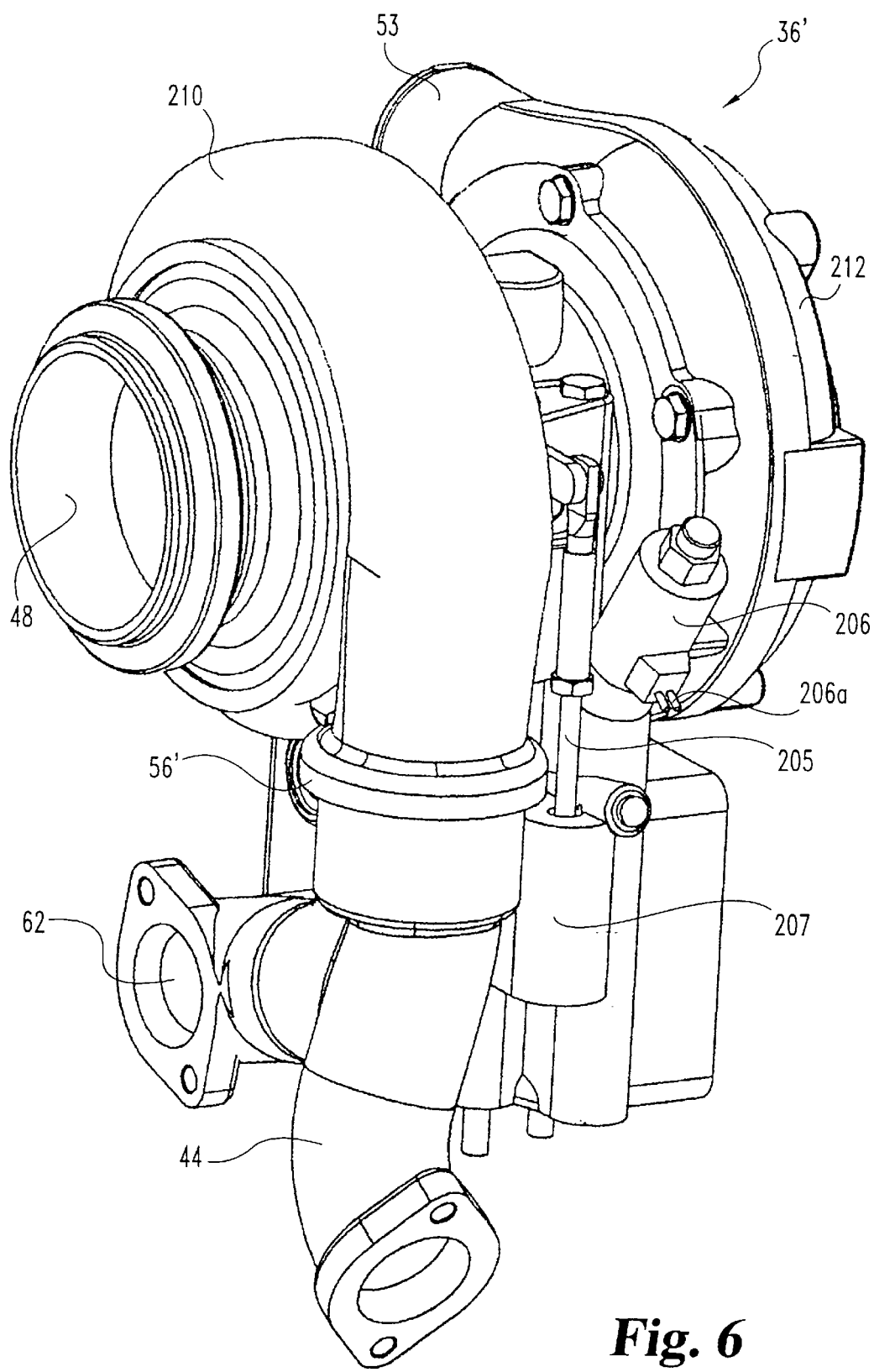
FIG. 6 is a perspective view of a turbocharger according to one embodiment of the present invention.
Figure 7:
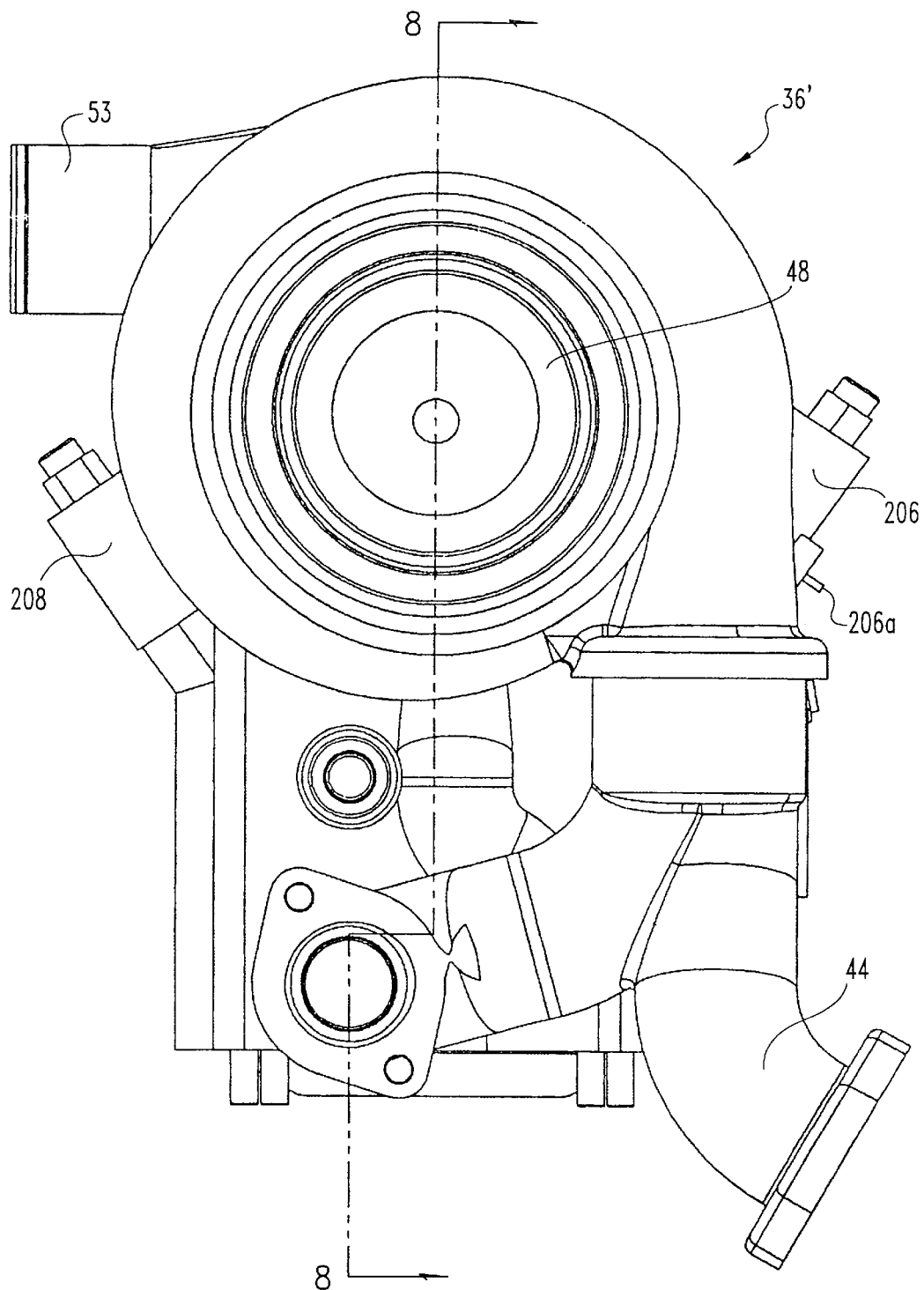
FIG. 7 is an elevational view of the turbocharger of FIG. 6.

FIGS. 6 and 7 show a turbocharger 36' according to one embodiment of the present invention. Turbocharger 36' includes a support housing assembly 56' which includes static structure such as turbine inlet passage 44, EGR outlet 62, turbine housing 210, and compressor cover 212, as well as other static support structures of the turbocharger assembly. Turbocharger assembly 36' also includes a pair of actuators for actuating and operating a restrictor valve and an EGR valve. The actuator for the restrictor valve preferably includes an electrical solenoid 206 which controls the supply of hydraulic fluid to a piston (not shown) contained within cylinder 207. Supply of oil to one side of the piston results in the piston pushing and stroking spring-biased actuator linkage 205. Solenoid 206 provides oil pressure to cylinder 207 preferably based upon a pulse width modulated electrical signal received at electrical connector 206a from a controller.

Figure 8:
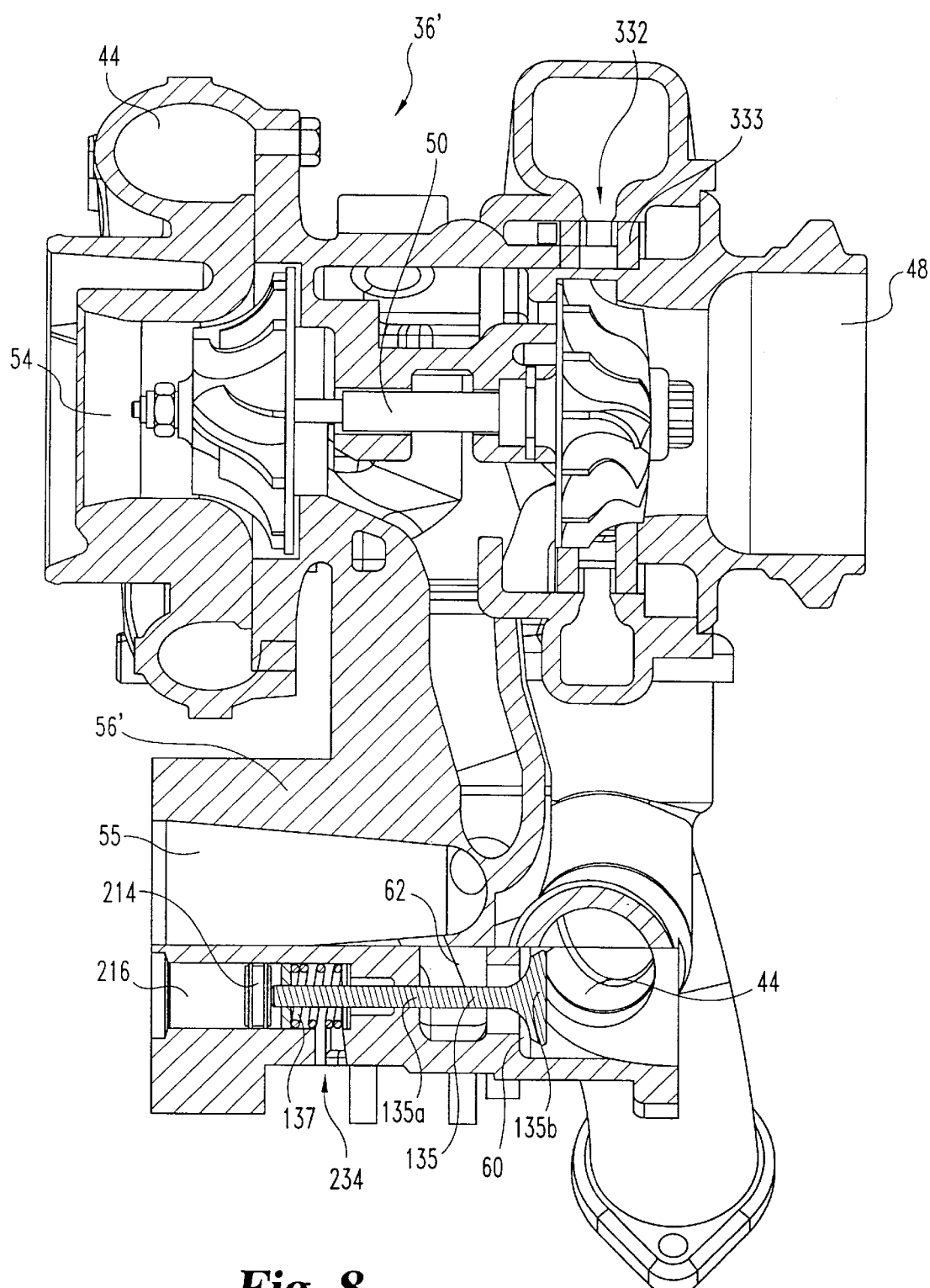
FIG. 8 is a cross-sectional view of the turbocharger of FIG. 7 as taken along line 8—8 of FIG. 7.

The restrictor valve of turbocharger 36' is a variable vane assembly 332 best seen in FIG. 8 which includes one or more moveable restricting devices. The moveable restricting devices are variable turbine inlet vanes 333 that are rotatable so as to increase or decrease the flow area into turbine 46. Movement of linkage 205 results in movement of flow restricting device 333 of restrictor valve 332. By reducing and restricting the flow area into turbine 46, the flow resistance of the turbine inlet passage is increased with a resulting increase in exhaust gas pressure and decrease in exhaust gas flow through turbine 46. Preferably, restricting devices 333 also change the angle of incidence for the direction of the exhaust gas that flows onto the blades of turbine 36. By changing the angle of incidence, it is possible to change the efficiency of turbine 36. Decreasing the efficiency of turbine 36 results in an increase in exhaust gas pressure. Restrictor valve 332 also permits rotor 50 to maintain a higher rotational speed during restricted flow operation, which results in improved transient response of the turbocharger and engine.

Support housing 56' also includes an EGR valve for recirculating the higher pressure exhaust gas to intake passageway 26. Turbocharger 36' includes an EGR valve 234 which includes a valve member 135 comprised of a stem 135a and a head 135b biased to the closed position by a return spring 137. Valve member 135 may be moved to the opened position by a piston 214 slidable within a cylinder 216. Electrical solenoid 208 is preferably provided with a pulse width modulated signal to control the flow of hydraulic fluid to one side of piston 214, thus causing valve member 135 to move to the opened position. When opened, valve inlet 60 is in fluid communication with valve outlet 62, which provides recirculated exhaust gas to intake passageway 26. Restrictor valve 332 may be adjusted independently of the setting of EGR valve 234.

Figure 9:
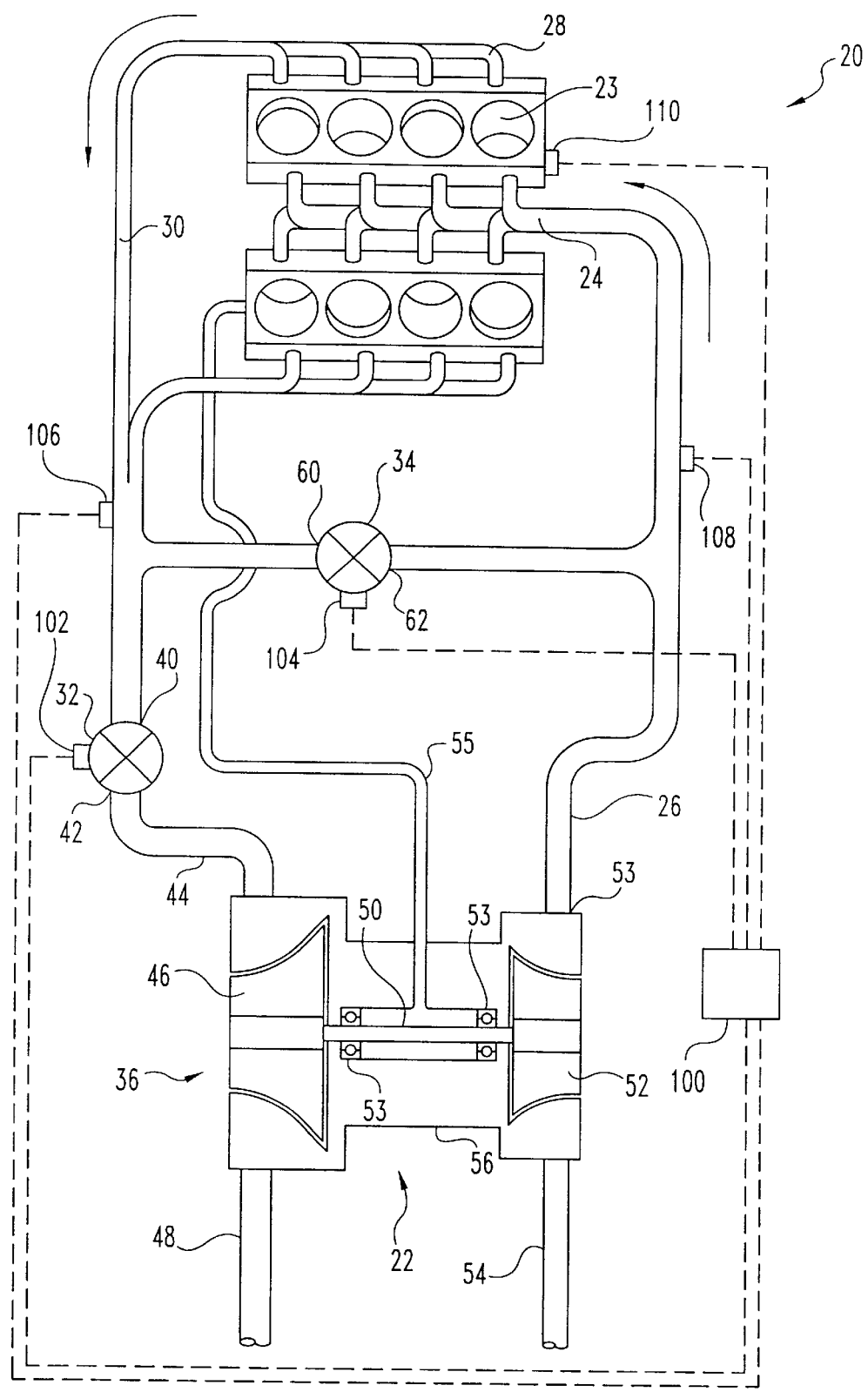
FIG. 9 is a schematic representation of one embodiment of an exhaust gas recirculation system controlled by an electronic controller.

Another embodiment of the present invention includes a system for controlling the flow of exhaust gas into the intake manifold. As shown in FIG. 9, a controller 100 is in electrical communication with an actuator 102 for a restrictor valve 32, and also an actuator 104 for an EGR valve 34. Valve 32 and 34 may be any of the valves described herein or their equivalents. Preferably, controller 100 also receives various signals related to the state of engine 20, such as RPM, power demand, intake gas temperature and others.

Controller 100 receives a first signal corresponding to exhaust gas pressure from a first sensor 106, and also a second signal corresponding to intake gas pressure from a second sensor 108. Controller 100 is preferably a digital electronic controller including memory and a processing unit. However, controller 100 may also be a programmable logic controller, or an analog electronic controller. Sensors 106 and 108 are any of those known to those of ordinary skill in the art for producing an electrical output in response to a gas pressure. Actuators 102 and 104 are preferably electrohydraulic actuators that convert a pulse width modulated electronic signal to a flow of hydraulic fluid. However, actuators 102 and 104 may also be electrohydraulic torque motors, electropneumatic actuators, electric motors such as stepper motors, or other devices known to those of ordinary skill in the art for changing the position of a moveable element within a valve.

Controller 100 is responsive to an exhaust gas pressure signal and an intake gas pressure signal to actuate valve 32 and/or valve 34 for a particular engine operating condition determined by engine sensors 110. For example, during cold start-up of a diesel engine, controller 100 may close valve 32 so as to substantially restrict the flow of exhaust gas into turbine 46 and also to increase the back pressure on engine 20, thereby providing decreased warm up time. As another example, during operation at peak torque, valve 32 may be adjusted to a position of increased flow restriction until exhaust gas pressure as sensed by sensor 106 is greater than intake pressure as sensed by sensor 108. When exhaust gas pressure exceeds intake gas pressure, controller 100 may open EGR valve 34 so as to permit the recirculation of exhaust gas into intake manifold 24. The amount of exhaust gas being recirculated may be increased by further restricting the flow of exhaust gas through valve 32, thereby increasing exhaust gas pressure and increasing the percentage of exhaust gas recirculating into intake manifold 24. In addition, the controller may maintain the flow of recirculated exhaust gas at a predetermined amount by adjusting the flow restricting device to maintain a predetermined pressure differential across the EGR valve. This predetermined pressure differential may be maintained even as intake gas pressure changes.

Various embodiments of restrictor valve 32 and exhaust gas recirculation valve 34 have been described. Those of ordinary skill in the art will recognize that different embodiments of the valves may be combined in the exhaust gas recirculation system 22.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method for recirculating a predetermined flow of exhaust gas into the intake manifold of a turbocharged engine, comprising:
    providing an internal combustion engine, a turbocharger for receiving exhaust gas from the engine at a first pressure and providing intake gas to the engine at a second pressure, a restrictor valve for adjusting the first pressure and an exhaust gas recirculation valve for recirculation of exhaust gas into the intake gas;
    alternately adjusting the restrictor valve and the exhaust gas recirculation valve to achieve one or more of a predetermined exhaust gas recirculation flow and a predetermined relationship between the first pressure and the second pressure.

2. An exhaust gas recirculation system for an internal combustion engine producing exhaust gas and accepting intake gas comprising:
    a turbocharger for increasing the pressure of the intake gas to the engine, said turbocharger having a turbine;
    a restrictor valve with an inlet accepting the exhaust gas from the engine, a first outlet in fluid communication with the turbine, a second outlet in fluid communication with the intake manifold;
    said restrictor valve adjustable to increase the pressure of the exhaust gas and to divert exhaust gas selectively between the said first outlet and said second outlet; and
    said restrictor valve includes a rotatable barrel-shaped semi-cylindrical valve plug having a first, second, and third position, and intermediate positions throughout,
    the first position substantially restricting fluid communication from the inlet to the first outlet and substantially restricting fluid communication from the inlet to the first outlet, the second position permitting unobstructed fluid communication from the inlet to the first outlet and substantially restricting fluid communication from the inlet to the second outlet, and the third position substantially restricting fluid communication from the inlet to the first outlet and permitting unobstructed fluid communication from the inlet to the second outlet.

3. The apparatus of claim 2, wherein one support housing assembly supports said turbine and said restrictor valve.

4. A system comprising:
    an internal combustion engine producing exhaust gas and accepting intake gas, the exhaust gas being at a first pressure and the intake gas being at a second pressure, said engine having an intake manifold;
    a restrictor valve receiving exhaust gas from said engine, said restrictor valve having an actuatable flow restricting device for varying the first pressure, said restrictor valve having a first outlet;
    a turbocharger with a turbine with a first inlet, the first inlet being in fluid communication with the first outlet of said restrictor valve;
    said turbocharger having a compressor with a first outlet in fluid communication with said intake manifold;
    an exhaust gas recirculation valve having a second inlet accepting the exhaust gas and a second outlet in fluid communication with said intake manifold and is actuatable between an opened position in which the second inlet and second outlet are in fluid communication and a closed position in which the second outlet is substantially sealed from the second inlet;
    a first sensor for providing a first signal corresponding to the first pressure;
    a second sensor for providing a second signal corresponding to the second pressure; and
    a controller responsive to said first signal and said second signal, said controller operable to independently adjust said flow restricting device and said exhaust gas recirculation valve to vary the first pressure and to achieve a predetermined relationship between the first pressure and the second pressure.

5. The system of claim 4 wherein said controller includes a digital processor.

6. The system of claim 4 wherein said controller includes a means for detecting one or more specific engine operating conditions; and
    said controller opens said exhaust gas recirculation valve when the first pressure is greater than the second pressure and when said specific engine operating conditions is detected.

7. The system of claim 6 wherein said specific engine operating condition is warm engine.

8. The system of claim 6 wherein said specific engine operating condition is peak torque.

9. An exhaust gas recirculation system for an internal combustion engine producing exhaust gas and accepting intake gas comprising:

a turbocharger for increasing the pressure of the intake gas to the engine said turbochager having a turbine and a support housing;

a restrictor valve for accepting the exhaust gas from the engine and adjustable to increase the pressure of the exhaust gas, said restrictor valve having an outlet in fluid communication with the turbine; and an exhaust gas recirculation valve with an inlet and an outlet and a valve member selectively movable between opened and closed position, the inlet being in fluid communication with the exhaust gas, the outlet being in fluid communication with the intake of the engine, the inlet being in fluid communication with the outlet in the opened position, and the inlet being substantially sealed from the outlet in the closed position;

wherein said restrictor valve and said exhaust gas recirculation valve are independently adjustable; and, said turbine, said restrictor valve, and said exhaust gas recirculation valve are commonly supported within said support housing.

10. The apparatus of claim 9, wherein said exhaust gas recirculation valve includes a poppet valve.

11. The apparatus of claim 9, wherein said exhaust gas recirculation valve includes a wastegate valve.

12. The apparatus of claim 9, wherein said restrictor valve includes a variable geometry turbine inlet.

13. The apparatus of claim 9, wherein said restrictor valve includes a butterfly valve.

14. An exhaust gas recirculation system for an internal combustion engine producing exhaust gas and accepting intake gas comprising:

a turbocharger for increasing the pressure of the intake gas to the engine, said turbocharger having a turbine;

a restrictor valve for accepting the exhaust gas from the engine and adjustable to increase the pressure of the exhaust gas, said restrictor valve having an outlet in fluid communication with the turbine;

an exhaust gas recirculation valve with an inlet and an outlet and a valve member selectively movable between opened and closed position, the inlet being in fluid communication with the exhaust gas, the outlet being in fluid communication with the intake of the engine, the inlet being in fluid communication with the outlet in the opened position, and the outlet being substantially sealed from the inlet in the closed position;

a linkage mechanism coupled to said restrictor valve and slidably coupled to said exhaust gas recirculation valve, said linkage mechanism having a first range of motion adjusting only said restrictor valve and having a second range of motion adjusting both said restrictor valve and said exhaust gas recirculation valve.

15. The apparatus of claim 14 wherein said linkage mechanism includes:

a pivotal lever arm operable to adjust said restrictor valve;

a rocker arm operable to adjust said exhaust gas recirculation valve;

a first linkage coupled to said pivotal lever arm;

a second linkage having a first end and a second end, said first end slidably coupled to said pivotal lever arm; and said second end of said second linkage coupled to said rocker arm.

16. The apparatus of claim 14 wherein said exhaust gas recirculation valve includes a poppet valve.

17. The apparatus of claim 14 wherein said exhaust gas recirculation valve includes a wastegate valve.

18. The apparatus of claim 14 wherein said restrictor valve includes a variable geometry turbine inlet.

19. The apparatus of claim 14 wherein said restrictor valve includes a butterfly valve.

20. The apparatus of claim 14 wherein said turbocharger includes a support housing and said turbine, said restrictor valve, and said exhaust gas recirculation valve are commonly supported within said support housing.

21. A system comprising:

an internal combustion engine producing exhaust gas and accepting intake gas, the exhaust gas having a first pressure, and the intake gas having a second pressure, said engine having an intake manifold;

a turbocharger with a turbine with a first inlet;

said turbocharger having a compressor with a first outlet in fluid communication with said intake manifold, a restrictor valve with a second inlet accepting the exhaust gas from the engine, a second outlet in fluid communication with the turbine first inlet, a third outlet in fluid communication with the intake manifold;

a first sensor for providing a first signal corresponding to the first pressure;

a second sensor for providing a second signal corresponding to the second pressure;

a controller responsive to said first signal and said second signal, said controller operable to adjust said restrictor valve to vary the first pressure and to achieve a predetermined relationship between the first pressure and the second pressure.

22. The system of claim 21 wherein said controller includes a means for detecting one or more specific engine operating conditions; and said controller is operable to adjust restrictor valve to substantially restrict fluid communication from the second inlet to the third outlet when the second pressure is greater than the first pressure and when said specific engine operating conditions is detected.

23. The system of claim 22 wherein said specific engine operating condition is warm engine.

24. The system of claim 22 wherein said specific engine operating condition is peak torque.

* * * * *